March 24, 1970 J. J. BIGENWALD ET AL 3,502,803

FACSIMILE LINE SKIPPING APPARATUS

Filed May 12, 1967 7 Sheets-Sheet 1

INVENTORS
JOHN J. BIGENWALD
ROBERT W. RAMBO
GERALD A. BUDDENDECK

BY Ronald Zibelli
Franklyn C. Weiss
ATTORNEYS

FACSIMILE LINE SKIPPING APPARATUS

INVENTORS
JOHN J. BIGENWALD
ROBERT W. RAMBO
GERALD A. BUDDENDECK
BY Ronald Zibelli
Franklyn C. Weiss
ATTORNEYS INVENTORS
JOHN J. BIGENWALD
ROBERT W. RAMBO
GERALD A. BUDDENDECK
BY Ronald Zibelli
Franklyn C. Weiss
ATTORNEYS March 24, 1970 J. J. BIGENWALD ET AL 3,502,803

FACSIMILE LINE SKIPPING APPARATUS

Filed May 12, 1967 7 Sheets-Sheet 4

INVENTORS
JOHN J. BIGENWALD
ROBERT W. RAMBO
BY GERALD A. BUDDENDECK
Ronald Zebelle
Franklyn C. Weiss
ATTORNEYS INVENTOR.
JOHN J. BIGENWALD
ROBERT W. RAMBO
GERALD A. BUDDENDECK
BY Ronald Zebelle
Franklyn C. Weiss
ATTORNEYS

FACSIMILE LINE SKIPPING APPARATUS

Filed May 12, 1967 7 Sheets-Sheet 6

INVENTORS
JOHN J. BIGENWALD
ROBERT W. RAMBO
BY GERALD A. BUDDENDECK
Ronald Zibelli
Franklyn C. Weiss
ATTORNEYS INVENTORS
JOHN J. BIGENWALD
ROBERT W. RAMBO
GERALD A. BUDDENDECK
BY Ronald Zibelli
Franklyn C. Weiss
ATTORNEYS

United States Patent Office 3,502,803

Patented Mar. 24, 1970

3,502,803

FACSIMILE LINE SKIPPING APPARATUS

John J. Bigenwald, Rochester, Robert W. Rambo, Pittsford, and Gerald A. Buddendeck, Rochester, N.Y., assignors to Xerox Corporation, Rochester, N.Y., a corporation of New York Filed May 12, 1967, Ser. No. 638,060

Int. Cl. H04n 5/76

U.S. Cl. 178—6.6 15 Claims

ABSTRACT OF THE DISCLOSURE

A facsimile graphic communication system wherein the white area on a document or the like is rapidly transported past the scanning station in accordance with the lack of information thereon. White line skipping is provided wherein prescan apparatus and associated stepping devices rapidly step the white or lack of information areas on a document or the like past the optical scanner.

Background

As is known in a normal facsimile system, a document or the like to be transmitted is scanned at a transmitting station to convert information on the document into a series of electrical signals. These video signals, or carrier modulated signals corresponding thereto, are then coupled to the input of a communication link interconnecting the transmitter with a receiver. At the receiving location, the video signals, in conjunction with suitable synchronizing signals, selectively control the actuation of appropriate marking means to generate a facsimile of the document transmitted.

A principal application of facsimile equipment is the transmission of printed or typewritten documents or letters. It is a distinguishing characteristic of such original documents that printing or typing is arranged in substantially horizontal lines. Examination of a typical letter, for example, will show that lines of typing actually occupy considerably less than half the vertical dimension of the letter, the rest of this dimension being blank and corresponding to spaces between lines as well as blank spaces at the top and bottom of the letter. In a conventional facsimile system, all parts of such a letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

A prior art technique of overcoming the excessively long transmission time in transmitting a document with large amounts of background or white information is to detect the white areas on the document by means of a prescan arrangement in order to step the optical scan means past such areas of no information. In application No. 471,874, filed July 14, 1965, now U.S. Patent 3,448,-207, entitled Method and Apparatus for Accomplishing Line Skipping in a Facsimile System, and assigned to the same assignee, there is disclosed a white line skipping technique for a facsimile system, wherein a document is mounted on a rotating drum arrangement. Such a drum scanning arrangement has the inherent disadvantage in that an operator is required to attach to and remove the document from the drum before and after each document is transmitted to the remote location. In addition, this arrangement provides for the advancing of the scanning unit itself which necessitates an accurate and thus more expensive drive system. Advanced facsimile systems aim toward a continuous document feeding apparatus or at least one where a minimum amount of document handling is required.

Objects

It is, accordingly, an object of the present invention to optimize the information handling capability of graphic communication systems.

It is another object of the present invention to reduce the operating costs of transmitting graphic information on a document or the like that includes large areas of white or redundant background information.

It is another object of the present invention to provide facsimile equipment in which blank scan lines are automatically skipped at both the transmitter and receiver.

It is another object of the present invention to provide white line skipping in a facsimile communication apparatus by rapidly advancing the white areas on a document past the optical scanning area.

It is another object of the present invention to automatically detect and skip white lines on a document or the like by a prescan arrangement and incremental document stepping in a facsimile communication system.

Brief summary of the invention

In accomplishing the above and other desired aspects, applicants have invented novel methods and improved apparatus for providing white line skipping in a facsimile graphic communication system. The subject invention includes the incremental stepping of a document or the like to be scanned past a rotating turret-type of facsimile scanner. Thus, a document to be scanned is brought by incremental steps to the scan station and halted while the lines are being scanned. After each line is scanned, the paper is incrementally stepped to allow for the scanning of the next set of scan lines. Through a scan detector lens and by means of reflecting mirrors and prisms, the scan image is projected onto a photodetector cell array comprising one data cell and a plurality of prescan cells. That is, the information from the lines scanned at the present moment is projected onto the data detector cell while a predetermined number of future scan lines are projected onto the prescan cells in order to detect the presence or absence of information on these future scan lines. If the prescan cells detect that no information is present on the next line or lines, the incremental stepping device is actuated accordingly to either step the document to the next line for information scanning or incrementally stepped the detected number of lines until the next line detected with data information is at the scan station.

Inasmuch as the scanning station comprises a rotating turret type mechanism, the document is curved as it passes the scan station. Accordingly, the incremental drive mechanism must not only provide for incremental document movement past the scan station, but also maintain the correct document position as it passes the scan station. Several embodiments of the incremental step drives are disclosed in order to provide such document positioning.

Description of the drawings

For a more complete understanding of applicants' invention, reference may be had to the following detailed description in conjunction with the drawings wherein.

Detailed description of the invention

Figure 1:
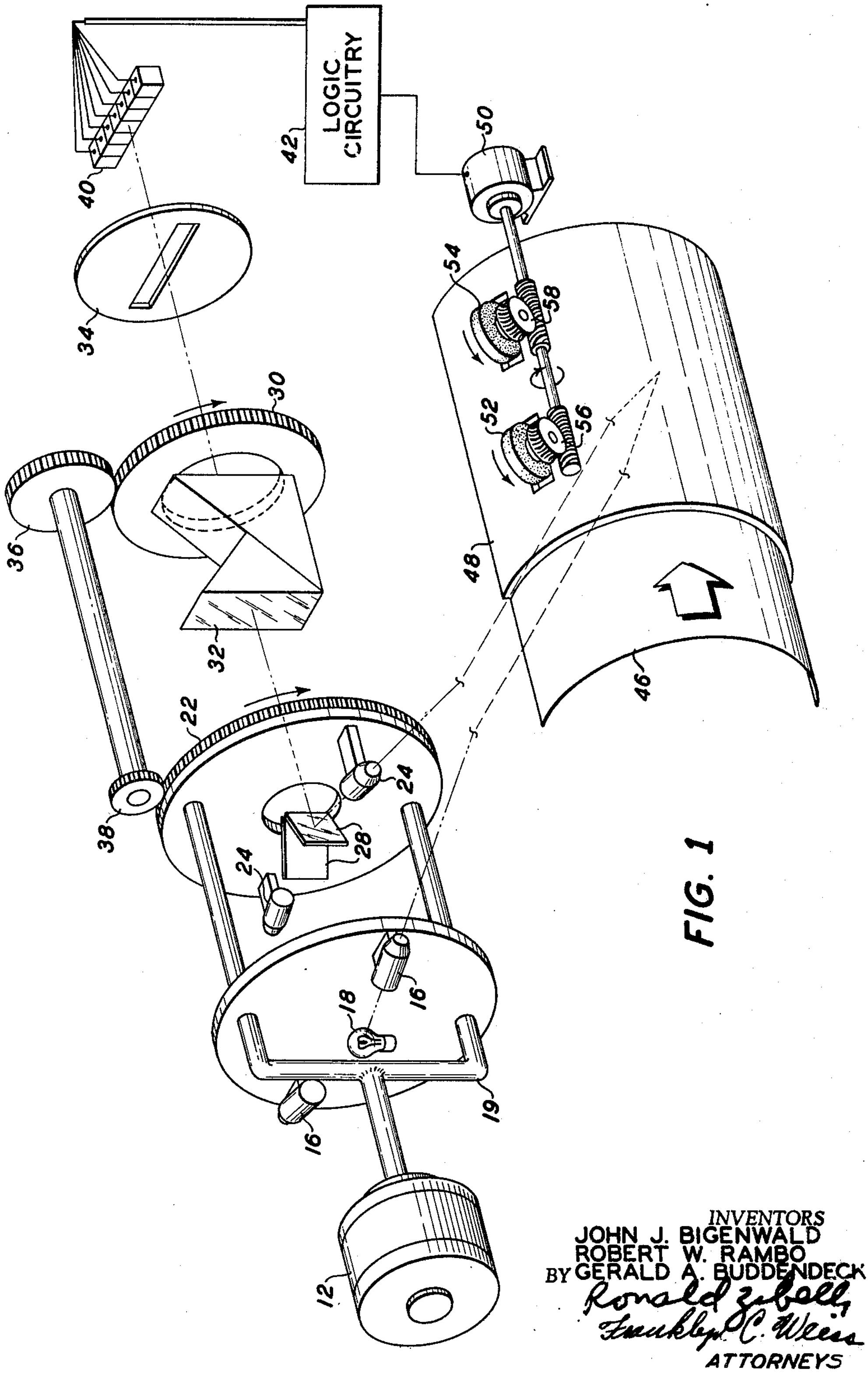
FIGURE 1 is an isometric view of the optical scanning and mechanical incremental stepping apparatus employed in the present invention.

Referring now to FIGURE 1, there is shown the optical scanning and incremental document stepping apparatus in accordance with the principles of the present invention. A turret drive mechanism 12 connected through shaft 14 is connected to the disc 20 by means of support devices 19. An illumination bulb 18 is centered at the axis of rotation of the disc 20 and by means of condenser lenses 16, placed 180 degrees apart on the outer edge of the disc, shines onto the document 46 as it is incrementally stepped by the scanning station. The condenser lenses 16 are shown for convenience only, as other means of projection onto a document my be provided, as for example, the elliptically shaped reflectors in FIGURES 2 through 5. Lens systems 24 revolve at the same rate as do the condenser lenses 16, by means of the support apparatus 19, which is connected through the disc 20 onto disc 22. This provides exact synchronization between the scanning beam and detector lenses 24. Placed at the center of disc 22 and rotating therewith on the same axis are the scanning mirrors 28 for reflection of the detected image to the rest of the detection system. The mirrors 28 are also shown for convenience, as a prismatic mirror may also be used.

As seen on the disc 22 in FIGURE 1, the objective lenses 24 are placed 180 degrees apart on the scan turret 22. If the system is to be provided with transceiver capabilities, write heads, of any known design, would also be placed on the turret 22, 180 degrees apart on the edge of the disc. Thus, as a document moves through the system in the scan mode, the objective lenses will be used for receiving the information modulated light beams from the document; while in the receive or write mode, the write heads will be utilized to print out, in any known manner, a facsimile of the document at the receiving location. Dual scan and write capabilities may be provided in order that scanning or writing be a continuous operation in that as one scan or write means leaves the edge of the document, the other associated apparatus is just coming in contact or in close proximity to the document at the scanning station.

The information modulated light beam reflected from the mirrors 28, are now passed through the prism arrangement 32. If a dove prism is utilized, it would rotate at one-half the speed of the turret 22. Gear arrangements 36 and 38 provide the step down in speed from the turret 22 to the prism support member 30. Such a lens system rotates at one half the object speed in order to provide a stationary image on the photodetector array 40, thereby permitting a fixed mounting for the array. Without the prism arrangement 32, the photodetector cell array would also have to rotate and the electrical leads would necessarily go through a slip-ring arrangement to prevent wire entanglement.

Aperture disc 34 is provided between the prism array 32 and the photodetector array 40 in order to determine the amount of received scan light information from the document to the photodetector array 40. Thus, in the embodiment shown herein at FIGURE 1, with eight photodetector cells, the optical scan system would utilize one of the photodetector cells in the array for data detection while the others provide the prescan capability for subsequent document stepping by the stepping motor 50.

The prism arrangement 32 which provides for the stationary object while rotating at one-half the object speed of the light applied thereto, may comprise any of the known types of prism. For instance, the prism could be a dove prism, as discussed above, shown and described in U.S. Patent 3,235,660. Other prism arrangements which work equally as well are the Pechan and the reversion prism, for example.

The document 46, whether a single sheet or a continuous web, would be advanced through the scanning system by means of the curved document guide 48 which provides the arcuate arrangement for the document. While the document guide and associated drive system apparatus are shown apart from the scanning turrets described above for ease of description, such arrangement would be closely spaced near the optical system to provide for accurate reproduction of the scan information.

Stepping motor 50, of any known design, incrementally steps document 46 by means of the right-angle drives 56 and 58 to the drive rollers 52 and 54 upon command from the logic circuitry 42. If, for instance, at one particular instant the scan system is scanning through portions of the document containing printed information, the photodetector array 40 would receive the information modulated light beam and accordingly disable logic circuitry 42 from initiating the white line skipping provision in accordance with the principles of the present invention. At a time that the photodetector array detects that the next scan area contains only white information, as for instance between typewritten lines on a document, the logic circuitry 42 would be enabled and the stepping motor 50 would incrementally drive the document 46 the predetermined number of detected white lines to the next line of information containing printed intelligence.

While the photodetector array 40, as shown in FIGURE 1, contains one data photocell and seven prescan cells, any number of prescan cells may be provided to give any number of prescan lines of information. It can be seen, however, that the maximum number of prescan lines that can be utilized are determined by the number of photocells in the prescan detector array 40. That is, if in fact there are twelve lines of white area that can be skipped, the subject system can only provide the maximum number of prescan lines, which in this case, for example, is seven; whereby the eighth line, even though it contains no printed information, must be scanned in order to determine the status of the next seven lines. In this instance, therefore, the eighth line would be scanned and the next four lines detected as containing all white information, and thus the document would be stepped the first seven lines, the eighth would be scanned, and the ninth through twelfth skipped to the thirteenth line containing the information. Various stepping arrangements are shown hereinafter in conjunction with FIGURES 9 through 12.

Figures 2, 2A:
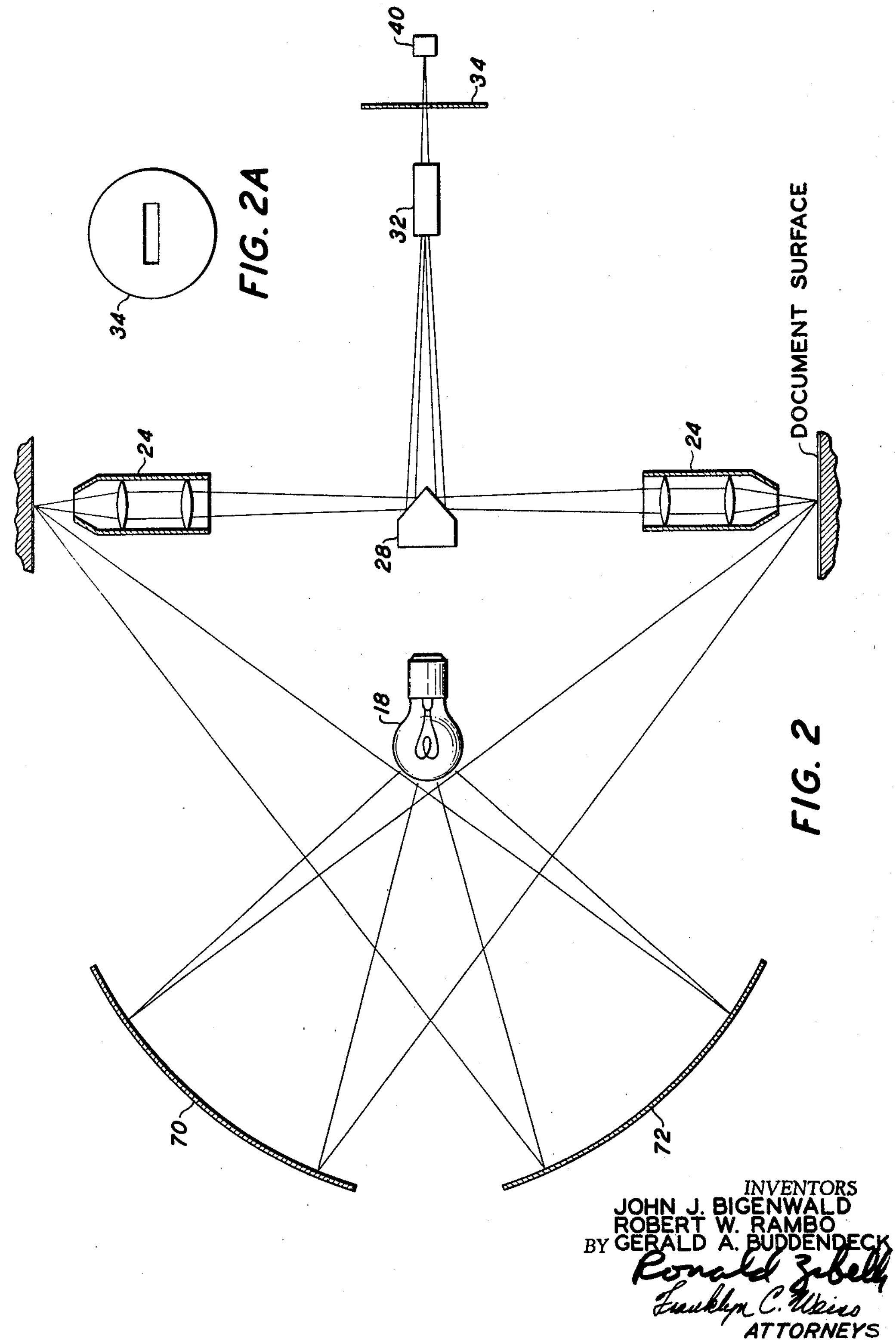
FIGURE 2 is a schematic diagram of one embodiment of the scanning arrangement in accordance with the principles of the present invention.
FIGURE 2*a* is a schematic diagram of the aperture disc included in the embodiment of FIGURES 2 to 6.

Referring now to FIGURE 2, there is shown the scanning arrangement which could be utilized in conjunction with the system of FIGURE 1. While condenser lenses are shown and described in conjunction with FIGURE 1, elliptical reflectors are utilized in FIGURES 2 through 5 in order to show that other scan structures are possible within the limits of the present invention. Thus, lamp 18, of the same type shown in FIGURE 1, emits light in all directions from a power source, not shown. While the lamp revolves, the axis of rotation is through the filament of the lamp, thereby allowing a predetermined amount of light to fall on the elliptical reflectors 70 and 72. The reflectors, rotating in conjunction with the lamp 18, scanning lenses 24, and the prism 28, as shown in FIGURE 1, reflect the light from lamp 18 to a point of focus which coincides with the area on a document to be scanned. The information modulated light beam is now reflected from the document through the scanning lens 24 onto prism 28. While the light is shown to be reflected from both scanning lenses at the same time, it is to be understood that only one of such scanning lenses would normally be adjacent to a document at one particular instant.

The light is reflected from the prism or mirror 28 through the prism arrangement 32 and aperture disc 34 to photoconductor array 40. As stated in conjunction with FIGURE 1, prism arrangement 32 is rotating at one half the object speed of the scanning lenses 24 in order to provide a stationary image on the photodetector array 40. Between the prism arrangement 32 and the photoconductor array 40 can be placed the aperture disc 34, which is seen more fully in conjunction with FIGURE 2A, to determine the amount of light allowed to fall on the array. In this embodiment the aperture disc 34 would be stationary as the image propagated by prism 32 is a stationary image by the inherent operation thereof, as hereinbefore described. The array 40 then converts the optical light to electrical signals for the determination of video signals to be transmitted and control signals used to incrementally advance the document past the all white background scan lines.

Figures 3, 3A:
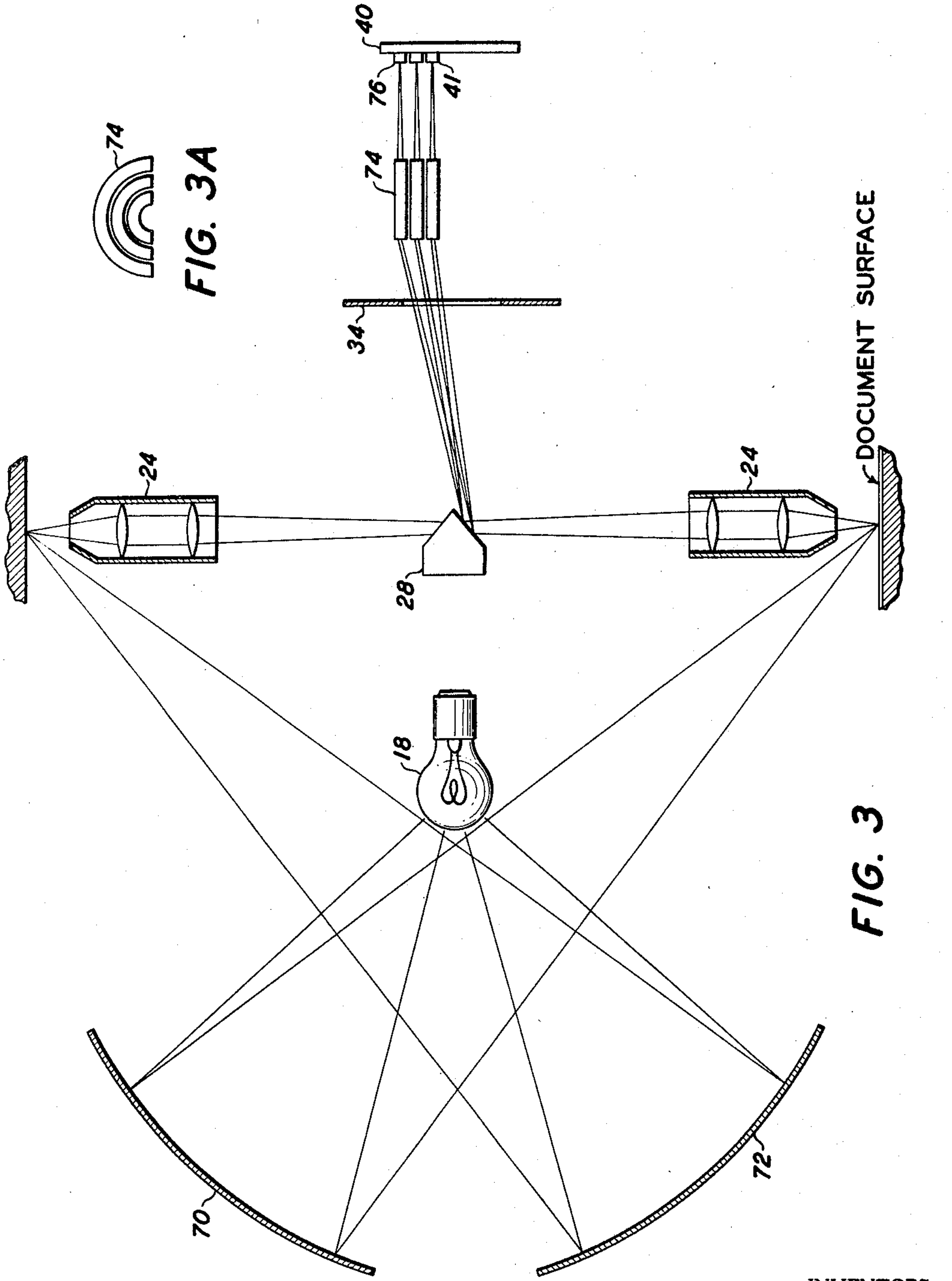
FIGURES 3, 3*a*, 4, 5, 5*a*, and 6 are further embodiments of the optical scanning system that could be utilized in the embodiment shown in FIGURE 1.
Figure 4:
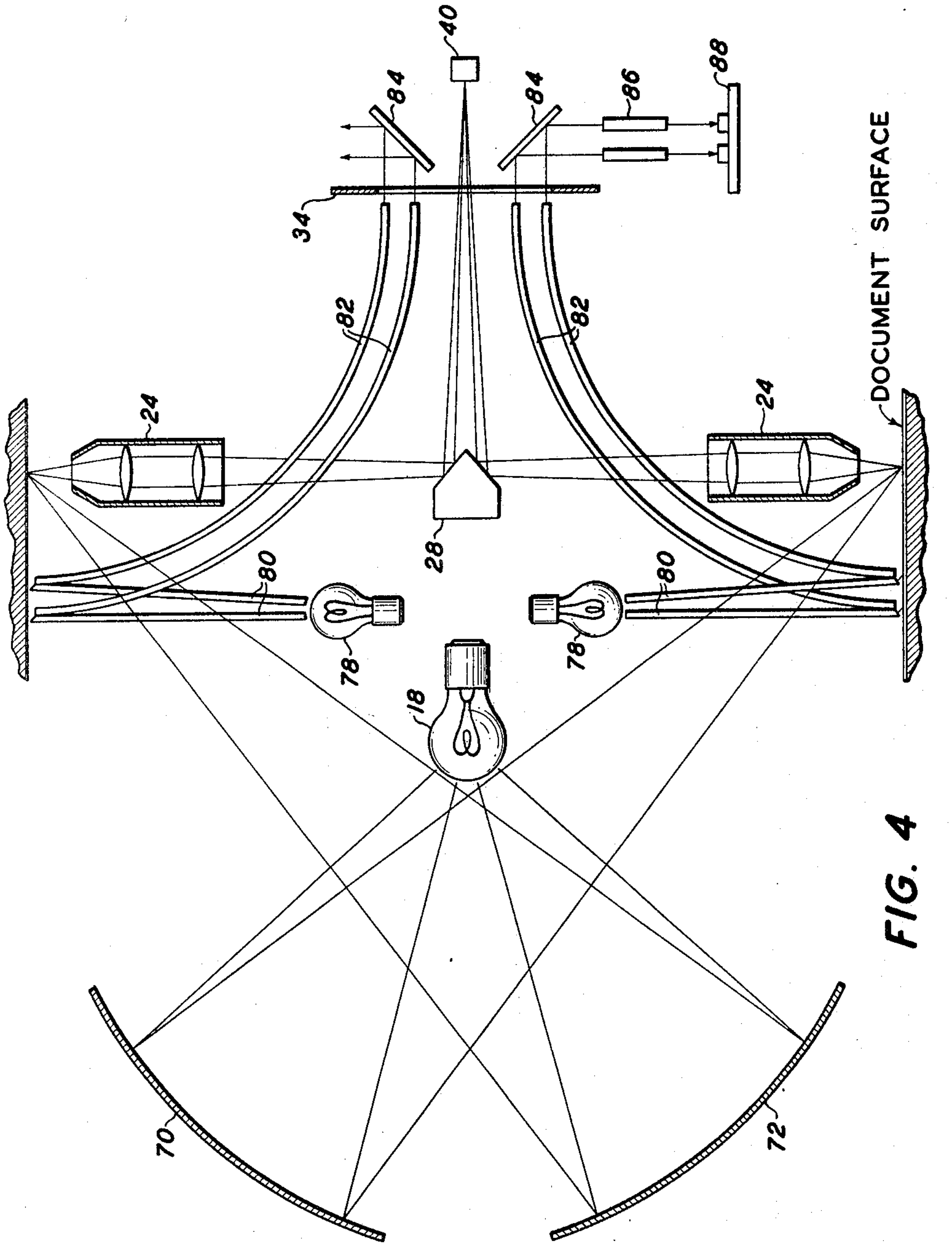
Figures 5, 5A:
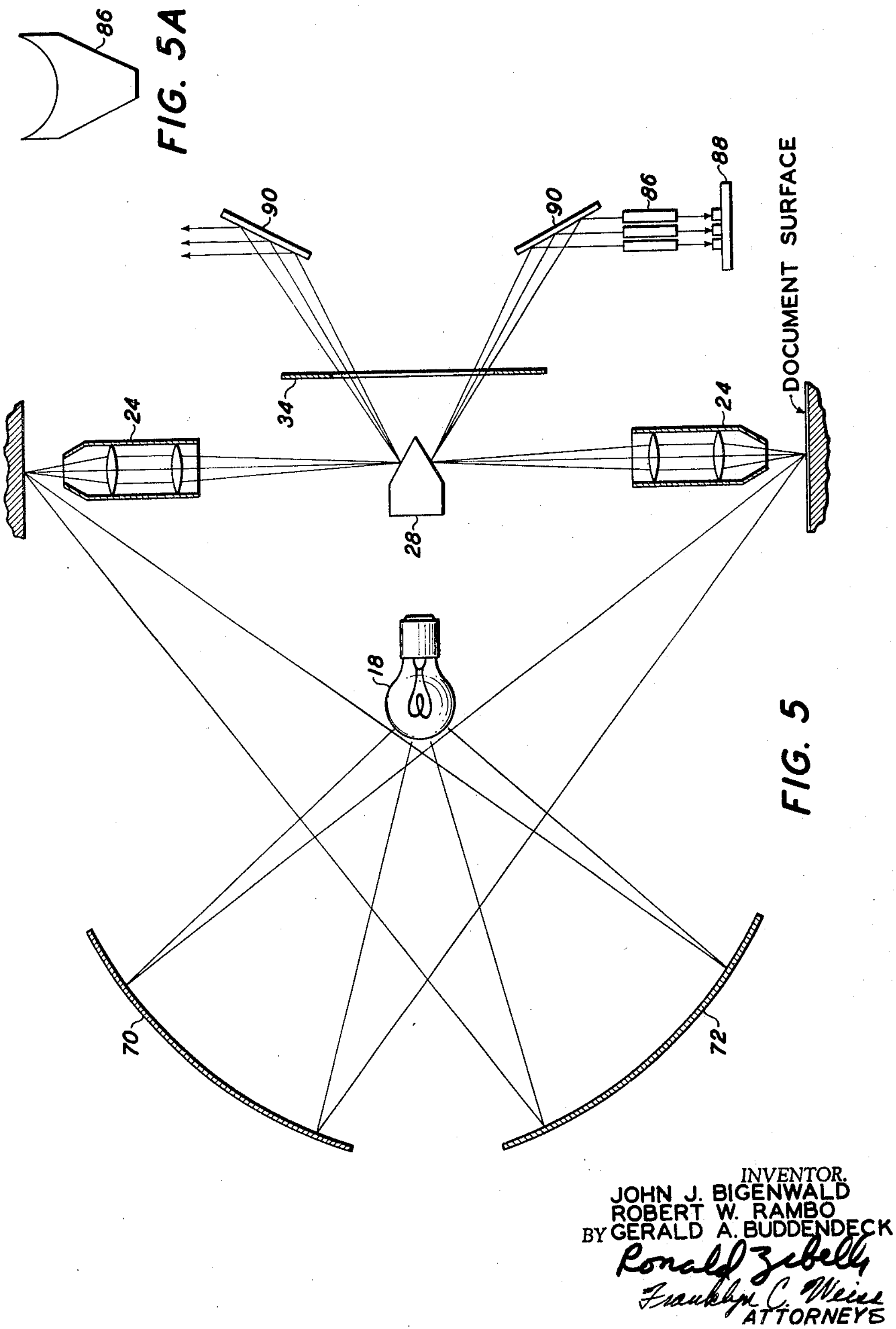

In referring now to FIGURES 3 to 5, similar articles are given the same numerical designations. Thus, lamp 18, reflectors 70 and 72, and scanning lenses 24, together with prism 28 rotate at the same speed with the axis of rotation again passing through prism 28, the filament of lamp 18 and between the reflectors 70 and 72. In a manner similar to that described in conjunction with FIGURE 2, the reflected light passing through the scanning lens 24 is reflected by prism 28 to the various photoconductors. In the arrangement of FIGURE 3, however, prescan is provided by the elongated hole in the rotating aperture disc 34 to circular arc light pipes 74. The light is presented through the light pipes to additional photodetectors 76, which provide the prescan detection for application to a logic circuit 42 as shown in FIGURE 1. The light pipes 74 are necessarily circular, as seen in FIGURE 3A, in that the reflected light information from the document is not on the axis of rotation through the lamp and prism but is revolved in a circle about such axis. To provide detection at the photoelectric array 40, a similar semi-circular array must be utilized as seen in FIGURE 3A, instead of the normal linear photodetector array to detect the rotating prescan information. The scan line representing intelligence would fall on photodetector 41 through one of the light pipes 74.

In FIGURE 4, prescan is provided by additional illumination lamps 78 admitting light through fiber optics 80 to the document to be scanned. The reflected light passes through light pipes 82 through the elongated hole in rotating aperture disc 34 to be reflected by rotating mirror 84 through light pipes 86 to a detector arrangement 88. In this instance, therefore, the only information detected by the single photoelectric detector 40 is the data on the data scan line. Prescan information is thus provided by the prescan lamps 78, or by lamp 8 for that matter, through the light pipe arrangement to the detector cells 88. Only two such prescan lines are shown, but it is obvious that any number of prescan fiber optics could be provided in accordance with the principles of the present invention.

FIGURE 5 shows another embodiment of the prescan arrangement utilizing the scanning lenses 24 to detect the light necessary for prescan information. Rotating mirrors 90 receive the reflected light from its associated scanning lens 24 and reflect the light through light pipes 86 to a detector arrangement 88. In this embodiment, the data detector is included in array 88, but it could remain alone, as seen above in conjunction with FIGURE 4. Only one array 88 is shown, inasmuch as the mirrors rotate with the scanning lenses 24, and the proper mirror 90 is adjacent to the light pipe arrangement 86 and array 88, when the document is being scanned.

In FIGURE 5A is shown a light pipe 86 as viewed from the side. Since the mirrors are rotated, the light pipe must detect the light over a large area and direct the light to a small area to be presented to the photodetector array 88. In the position shown, the light enters from the large arcuately shaped top area and is emitted from the smaller bottom area.

Figure 6:
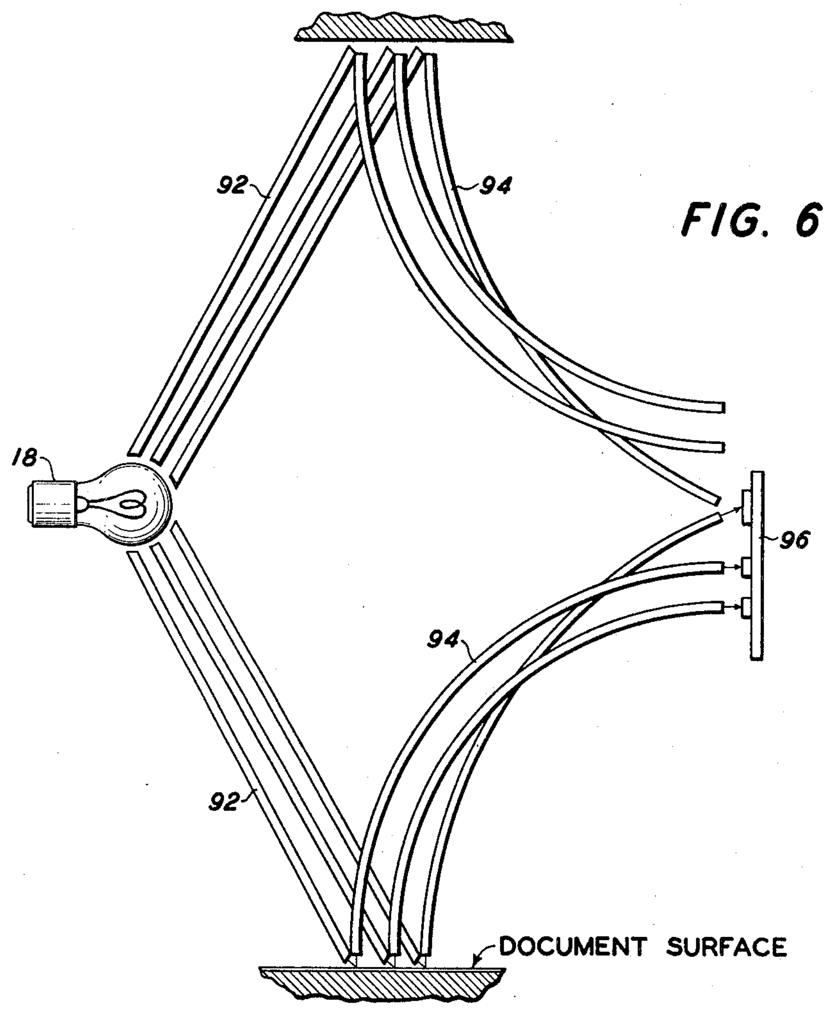

The arrangement shown in FIGURE 6 utilizes a fiber optic arrangement 92 and 94 presenting light directly to the scan areas on the document. In this embodiment, therefore, the reflecting surfaces 70 and 72 are not needed. The reflected light from the document travels through the return fiber optics 94 for presentation to a detector array 96 at the scanning area. In this manner also, the detector array must be provided with a slip-ring arrangement whereby the electrical output can pass therefrom to the external logic circuit arrangement for application to the stepping drive motor. The slip-ring provision, however, may be dispensed with, by using a circular detector array, as seen in FIGURE 3A.

Figures 7, 8:
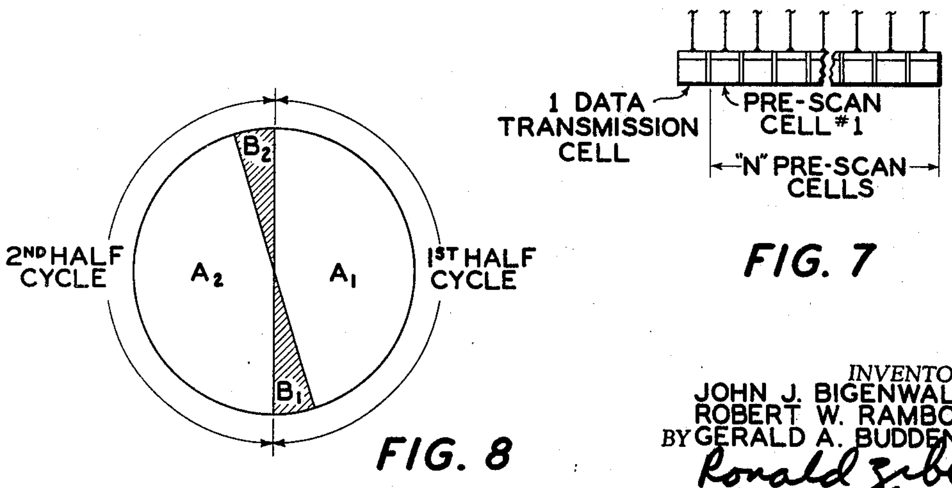
FIGURE 7 is a representative diagram of the photoelectric cell array in accordance with the principles of the present invention.
FIGURE 8 shows the scanning and stepping sequence of the embodiments according to the present invention.

Referring now to FIGURE 7, there is shown a representative diagram of the photoelectric cell array utilized in accordance with the principles of the present invention in the separate embodiments. As shown therein, the left hand end photoelectric cell, for example, is used for the detection of data along a predetermined scan line. The remaining photoelectric cells in the array are utilized for the detection of the prescan information as described herein. There are "N" prescan cells shown in FIGURE 7; the number of actual cells being determined only by the limits of the system by the accuracy of the focusing of the reflected information light beam from the document to the lens system. The first photoelectric cell removed from the data transmission cell would be for the first prescan line ahead of the line scanned for information data. The next prescan cells in order scan the next prescan lines up to the total number of cells in the photoelectric array. The photoelectric cells themselves may be solar cells or any other type of photoelectric cell known in the art which can perform the same function as described herein.

Inasmuch as the disclosed embodiments utilize oppositely disposed scanning apparatus on a rotating turret, there are specific times available for the stepping operations to occur. FIGURE 8 depicts the amount of time available for the various functions in one cycle of the turret apparatus. Two methods of utilizing prescan and skipping are described herein, but it is obvious that other stepping time sequence can be utilized in accordance with the rotating speed of the turret and the response time of the stepping motor. In FIGURE 8, the notation A1 is utilized for the period of rotation utilized for data detection. A2 is utilized for the second half cycle of detection by the other or oppositely disposed detector arrangement. The notation B1 and B2 denotes the "flyback" or dead time which must be inserted into the system to allow for synchronization or other functions. During the period A1, $N+1$ lines would be scanned by the first scanning lens, utilizing the solar cell array, for example, shown and described above in conjunction with FIGURE 7. If prescan cell No. 1 detects information along the first prescan line during time A1, then no skipping will occur. Therefore, the document will index ahead one step during the time B1. The information detected by prescan cell No. 1 is now in position to be transmitted by the data transmission cell seen in FIGURE 7. Data transmission will occur during the period A2. The document will automatically index ahead one step during time B2. The cycle is now ready to be repeated. If the prescan cells detect no information, i.e., all white or redundant background information, during period A1, then the document will be advanced $N-2$ steps during time A2, as well as indexed ahead one step during time B1 and one step during B2.

Prescanning occurs only during period A1. Skipping occurs only during A2. Automatic indexing of one step always occurs during periods B1 and B2. Data transmission would always occur during period A1. Data transmission also occurs during period A2 if prescan cell No. 1 detects information during A1; otherwise there is no data transmission during A2.

The second method utilizes the prescan during each half cycle, while the skip occurs in the backstroke period. Thus, during period A1, $N+1$ lines would be scanned by the first lens, just as in the first method described above. However, rather than merely indexing one step during period B1, both indexing and skipping would occur. This means that if "N" lines are prescanned and determined to be all white, "N" steps would have to be made during period B1. If the first half cycle time is, for purposes of example, 333 milliseconds and period A1 is 316 milliseconds, then the stepping must occur during the period B1, which would be 17 milliseconds. The second half cycle would then function in the same exact manner. This method would necessitate slowing the motor, i.e., pulsing the motor N successive times without allowing the paper drive system to come to a complete rest between pulses. Method No. 1, however, would permit discrete steps, the drive system coming to a definite stop between motor pulses.

Figure 9:
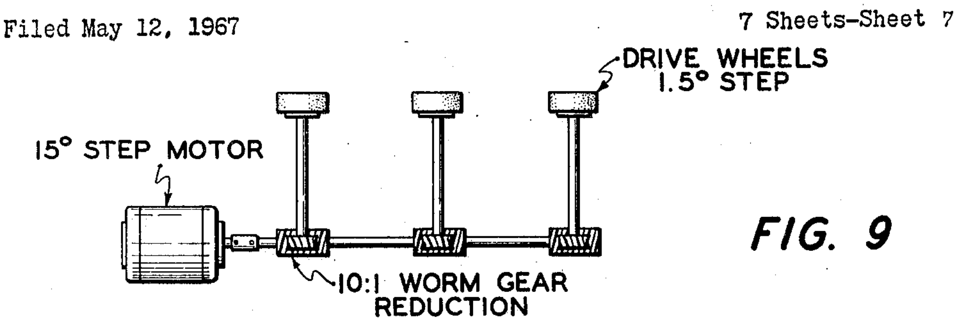
FIGURES 9, 10, 11 and 12 are representative diagrams of the separate embodiments of the incremental step-drive system.

FIGURES 9 to 12 disclose the various embodiments of the stepping motor drive which can be incorporated into the system in accordance with the principles of the present invention. FIGURE 9 discloses a stepping motor with a rotating shaft therefrom with worm gear arrangements for right angle driving the shafts perpendicular to the axis of rotation thereof. On the ends of the perpendicular shafts are the drive wheels, which by pressure contact drive the document past the scanning station. If the stepping motor advances 15 degrees per step, then with a 10 to 1 worm gear arrangement along the rotating shaft, the drive wheels are advanced 1½ degrees per step.

Figure 10:
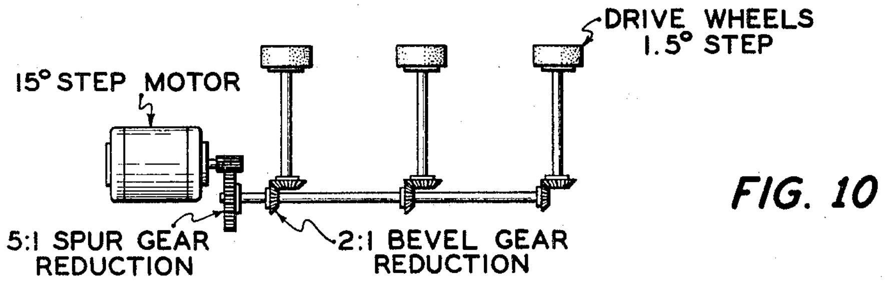

An alternate embodiment to the stepping motor arrangement in FIGURE 9 is shown in conjunction with FIGURE 10. A similar stepping motor would be utilized with a spur gear reduction system attached to the output shaft thereof. Along the drive linkage of the secondary spur gear would be bevel gear arrangements for driving the perpendicular shafts attached to the drive wheels. In this instance, therefore, if the motor is advanced 15 degrees per step, to effect 1½ degrees per step at the drive wheels, a 5 to 1 reduction is necessary at the spur gear at the output of the motor, while a 2 to 1 reduction is necessary at the bevel gears along the drive shaft.

Figure 11:
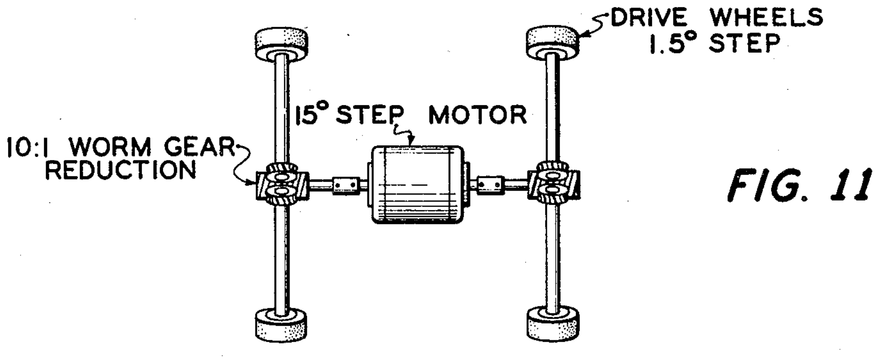

A third embodiment of the stepping drive arrangement is shown in conjunction with FIGURE 11. The same type of motor is utilized with the power take-off being on both ends of the motor shaft as it is being driven. Two worm-gear arrangements would be provided for driving the perpendicular drive shafts in providing the drive wheels in contact with the paper with 1½ degrees per step. Thus, the motor, if providing 15 degrees per step, must be driven into a 10 to 1 worm-gear reduction as shown in FIGURE 11 to effect such an incremental drive.

Figure 12:
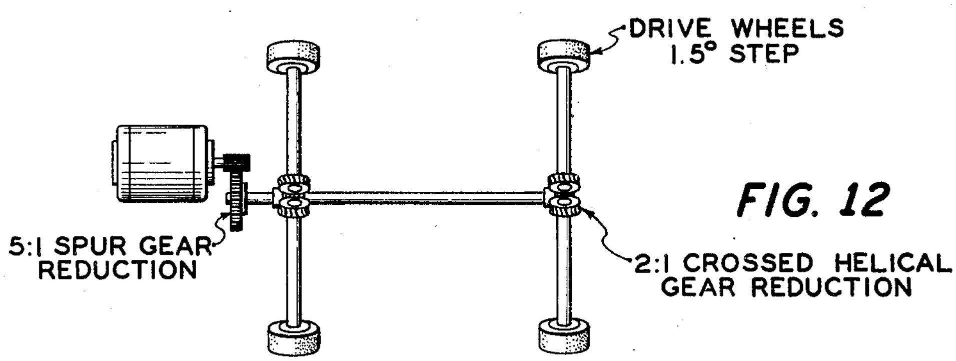

A further embodiment of the stepping drive system is shown in conjunction with FIGURE 12. The features of the stepping drive arrangements of FIGURES 10 and 11 are combined, in that the motor provides power into a 5 to 1 spur gear reduction system. Off the drive shaft of the secondary spur gear are provided 2 to 1 reduction crossed helical gear arrangements. Thus, as the motor turns the spur gear arrangement and thus the secondary drive shaft, the crossed helical gears provide perpendicular drive power to the external drive wheels at 1½ degrees per step.

The FIGURES 9 to 12 are shown in isometric view in that the document as it is drawn through the optical scanning system is curved by means of the document guide. Thus, the paper drives as shown and described above must provide for accurate movement of the document by means of the disclosed gear arrangements.

There has thus been disclosed and described improved apparatus for white line skipping in a facsimile graphic communication system. While the subject invention has been described in conjunction with separate embodiments, it is within the skill of one knowledgeable in the art to interchange various aspects of such embodiments without deviating from the principles of the present invention. Thus, while the present invention, as described herein, has been set forth in specific embodiments thereof, they are to be understood as illustrative only and not limiting.

What is claimed is:

1. A facsimile graphic communication system for transmitting electric video signals representative of intelligence on a document comprising, means for illuminating selected portions of said document, a rotating support member, optical scanning means mounted on said support member for scanning successive parallel line paths on said document, said line paths comprising one data scan line and a plurality of prescan lines, means mounted on said support member and rotating therewith for directing along the axis of rotation of said support member the reflected light from said document detected by said optical scanning means, photodetector means for converting that part of said reflected light representative of one scan line of intelligence into said electric video signals, prescan detector means for converting that part of said reflected light representative of prescan information into control signals indicative of the presence of intelligence on the future scan lines on said document, advance means for advancing said document past said optical scanning means in uniform increments in a direction substantially perpendicular to the direction of scan at the end of each scan time, control means responsive to said control signals for selectively actuating said advance means to incrementally advance said document past those prescan lines detected to be devoid of intelligence, and writing means mounted on said rotating support member adjacent said optical scanning means for creating a facsimile of an original document, said optical scanning means being utilized in the transmit mode and said writing means being utilized in the receive mode, and wherein said advance means in the receive mode advances a record sheet upon which said facsimile is being created in synchronism with an advance means in a transmit mode.

2. The system as set forth in claim 1 wherein said means for directing the detected light comprises a reflector mounted at the axis of rotation of said support means, and wherein said photodetector means and said prescan detector means comprise a single array of optical to electrical signal converter means, whereby said reflected light is projected thereon to generate said video signals and said control signals.

3. The system as set forth in claim 1 wherein said means for directing the detected light comprises a reflector mounted at the axis of rotation of said support means, and wherein said prescan detector means includes circular arc light pipe means to receive that part of said light directed by said reflector which is representative of the prescan information on said document, and said photodetector means mounted to receive directly from said reflector that part of said reflected light which is representative of the scan line of intelligence on said document.

4. The system as set forth in claim 1 wherein said optical scanning means includes
a first plurality of fiber optic means for presenting the prescan illumination directly to the document to be scanned in the form of light spots, and
a second plurality of fiber optic means for directing the reflected prescan illumination from the document along the axis of rotation of said disc support member, said first and second plurality of fiber optic means being mounted on and rotating with said support member, and wherein said prescan detector means includes
mirror reflecting means rotating with said optical scanning means for reflecting said prescan illumination at a direction perpendicular to said axis of rotation,
circular light pipe means for receiving said prescan illumination,
photodetector means mounted to receive said prescan illumination from said light pipe means for converting said prescan light information into said control signals.

5. The system as set forth in claim 1 wherein said means for directing the detected light comprises a reflector mounted at the axis of rotation of said support means, and wherein
said photodetector means and said prescan detector means comprise a single array of optical to electrical signal converter means, and
mirror reflecting means rotating with said optical scanning means for reflecting said detected light at a direction perpendicular to said axis of rotation, and
circular light pipe means for receiving and directing said detected light onto said single array.

6. The system as set forth in claim 1 wherein said optical scanning means includes
a first plurality of fiber optic means for presenting the illumination directly to the document to be scanned in the form of light spots, and
a second plurality of fiber optic means for directing the reflected illumination from the document along the axis of rotation of said support member, said first and second plurality of fiber optic means being mounted on and rotating with said support member, and wherein said photodetector means and said prescan detector means comprise a single array of optical to electrical signal converter means.

7. The system as set forth in claim 1 wherein said illuminating means comprises
a second rotating support member with its axis of rotation being coincident with the axis of rotation of said first rotating support member, and
incandescent lamp mounted on and rotating with said second support member with its filament passing longitudinally through said axis of rotation, and
means for directing said illumination onto selected portions of said document.

8. The system as set forth in claim 7 wherein said illumination directing means comprises
elliptical reflector means for directing at its point of focus the light illuminated from said incandescent lamp.

9. The system as set forth in claim 7 wherein said illumination directing means comprises
lens means mounted on said second rotating support member for focusing said lamp illumination on said document.

10. The system as set forth in claim 1 wherein said advance means includes
incremental drive motor means responsive to said control signals for advancing said document,
drive means coupled to said drive motor means for advancing said document past said rotating support member substantially arcuate to the edge thereof.

11. The system as set forth in claim 10 wherein said drive means comprises
first shaft means extending longitudinally from said drive motor means along the path of movement of said document,
at least one worm gear arrangement means mounted on said first shaft means,
at least one second shaft means coupled to said worm gear arrangement perpendicular to said first shaft means,
drive wheel means at the end of said second shaft means for driving in direct contact with said document in a direction parallel to said first shaft means.

12. The system as set forth in claim 10 wherein said drive means comprises
spur gear arrangement means attached to the shaft of said drive motor means,
first shaft means coupled to said spur gear means displaced from the axis of said drive motor means shaft and extending along the path of movement of said document,
at least one second shaft means coupled to said worm gear arrangement perpendicular to said first shaft means,
drive wheel means at the end of said second shaft means for driving in direct contact with said document in a direction parallel to said first shaft means.

13.. The system as set forth in claim 10 wherein said drive means comprises
first shaft means extending longitudinally in both directions from said drive motor means along the path of movement of said document,
worm gear arrangement means mounted on both ends of said first shaft means,
a pair of second shaft means coupled to said worm gear arrangement means on both ends of said first shaft means and extending perpendicular from said first shaft means, said pairs second shaft means being placed at an angle less than 180° so as to arcuately drive said document past said disc support member, and
drive wheel means at the ends of said second shaft means for driving in direct contact with said document in a direction parallel to said first shaft means.

14. The system as set forth in claim 10 wherein said drive means comprises
spur gear arrangement means attached to the shaft of said drive motor means,
first shaft means coupled to said spur gear means displaced from the axis of said drive motor means shaft and extending along the path of movement of said document,
at least one crossed helical gear arrangement means mounted on said first shaft means,
at least one pair of second shaft means coupled to said crossed helical gear arrangement extending perpendicular from said first shaft means, said pairs of second shaft means being placed at an angle less than 180° so as to arcuately drive said document past said disc support member, and
drive wheel means at the ends of said second shaft means for driving in direct contact with said document in a direction parallel to said first shaft means.

15. A facsimile graphic communication system for transmitting electric video signals representative of intelligence on a document comprising:
means for illuminating selected portions of said document,
a rotating disc support member,
optical scanning means mounted on said disc support member for scanning successive parallel lines paths comprising one data scan line and a plurality of prescan lines,
lens means mounted on said disc support member and rotating therewith for directing along the axis of rotation of said support member the light detected by said optical scanning means, prism means rotating about the same axis of rotation as said disc support member for producing a stationary image of the reflected light detected by said optical scanning means, photodetector means positioned at the point of focus of said lens means for converting that part of said stationary image representative of one scan line of intelligence into said electric video signals, prescan detector means adjacent to said photodetector means for converting that part of the stationary image representative of prescan information into control signals indicative of the presence of intelligence on the future scan lines on said document, advance means for advancing said document past said disc support member substantially arcuate to the edge thereof in uniform increments in a direction substantially perpendicular to the direction of scan at the end of each scan time, control means responsive to said control signals for selectively actuating said advance means to incrementally advance said document past those prescan lines detected to be devoid of intelligence, and writing means mounted on said rotating disc support member adjacent said optical scanning means for creating a facsimile of an original document, said optical scanning means being utilized in the transmit mode and said writing means being utilized in the receive mode, and wherein said advance means in the receive mode advances a record sheet upon which said facsimile is being created in synchronism with an advance means in a transmit mode.

References Cited

UNITED STATES PATENTS

| | | | |
|---|---|---|---|
| 1,857,130 | 5/1932 | Alexanderson | 178—7.1 |
| 2,443,953 | 6/1948 | Gillespie | 178—6.6 |
| 2,640,875 | 6/1953 | Devaux | 178—7.1 |
| 2,864,886 | 12/1958 | Lemmon | 178—7.1 |
| 3,201,512 | 8/1965 | Mason. | |
| 3,235,660 | 2/1966 | Treseder | 178—7.1 |
| 3,379,832 | 4/1968 | Judin | 178—7.6 |
| 2,287,413 | 6/1942 | Bruce | 178—6.6 |
| 2,776,336 | 1/1957 | Clauer | 178—6.6 |
| 3,064,077 | 11/1962 | Cary | 178—6.6 |
| 3,325,821 | 6/1967 | Reese | 178—6.6 |

ROBERT L. GRIFFIN, Primary Examiner

J. A. ORSINO, Jr., Assistant Examiner

U.S. Cl. X.R.

178—6, 7.1, 7.6; 250—234